(12) United States Patent
Winterhalder

(10) Patent No.: US 6,205,928 B1
(45) Date of Patent: Mar. 27, 2001

(54) GAS GENERATOR

(75) Inventor: Marc Winterhalder, Garching/Alz (DE)

(73) Assignee: TRW Airbag Systems GmbH & Co. KG, Aschau Inn (DE)

( * ) Notice: Subject to any disclaimer, the term of this patent is extended or adjusted under 35 U.S.C. 154(b) by 0 days.

(21) Appl. No.: 09/343,854

(22) Filed: Jun. 30, 1999

(30) Foreign Application Priority Data

Jul. 3, 1998 (DE) .......................................... 298 11 918 U

(51) Int. Cl.[7] .............................. C06D 5/00; B60R 21/32; B60R 21/26; B60R 21/28
(52) U.S. Cl. ...................... 102/530; 102/531; 280/737; 280/740; 280/741; 280/742; 280/735
(58) Field of Search ..................... 102/530, 531; 280/737, 741, 740, 735

(56) References Cited

U.S. PATENT DOCUMENTS

| | | | |
|---|---|---|---|
| 5,604,338 | * | 2/1997 | Paxton et al. ........................ 280/735 |
| 5,670,718 | * | 9/1997 | Nagahara ............................. 280/735 |
| 5,695,216 | * | 12/1997 | Sandstrom et al. ................... 280/737 |
| 5,799,973 | * | 9/1998 | Bauer et al. .......................... 280/741 |
| 5,931,495 | * | 8/1999 | Rink et al. ............................ 280/737 |

FOREIGN PATENT DOCUMENTS

0502630 A2 * 9/1992 (EP) .............................. B60R/21/26

* cited by examiner

Primary Examiner—Michael J. Carone
Assistant Examiner—Glenda L. Sánchez
(74) Attorney, Agent, or Firm—Tarolli, Sundheim, Covell, Tummino & Szabo L.L.P.

(57) ABSTRACT

The invention relates to a gas generator, comprising a first gas-generating stage and at least one gas-generating stage arranged downstream of the first stage, and also comprising a device for detecting a pressure change in the gas generator, wherein the device for detecting the pressure change comprises a chamber divided by a movable part into two partial chambers which are gas-tight with respect to each other, the partial chambers having openings which are in flow connection with the first stage and each have different cross-sectional areas, so that the pressure change spreads at different speeds in the two partial chambers and brings about a movement of the movable part, and the movable part being connected with a movement meter, which due to the movement of the movable part generates an electrical impulse to activate the second stage.

6 Claims, 2 Drawing Sheets

GAS GENERATOR

The invention relates to a gas generator, comprising a first gas-generating stage and at least one gas-generating stage arranged downstream thereof.

BACKGROUND OF THE INVENTION

A two-stage gas generator can be seen in the European Patent Application EP-A2 0 502 630. This describes a hybrid gas generator in which after the mechanical opening of a rupture membrane, cold gas flows out from a compressed gas chamber. The first gas-generating stage is therefore a cold gas stage. As a second gas-generating stage, a propellant charge is provided, which is automatically activated by the change in pressure inside the gas generator. This activation takes place by means of a percussion igniter arrangement connected with a reference pressure chamber.

A disadvantage of the arrangement according to EP-A2 0 502 630 is that this arrangement must compulsorily operate at a reference pressure, which corresponds approximately to the pressure in the compressed gas chamber. A simple adaptation of the generated gas volume is not possible by simple means, in particular not by reducing the pressure inside the gas generator without adapting the reference pressure. The mechanical ignition arrangement provided for the second gas-generating stage is extremely costly, requires several movable parts and the arrangement of striker and percussion igniter, in particular when filling the gas generator, represents a considerable safety risk, because an accidental activation of the percussion igniter can not be absolutely ruled out.

It is an object of the invention to provide a gas generator which makes possible an activation of the second gas-generating stage as a function of a pressure change in the gas generator, however independently of the extent of the pressure inside the gas generator.

SUMMARY OF THE INVENTION

The invention provides a gas generator, comprising a first gas-generating stage and at least one gas-generating stage arranged downstream of the first stage, and also comprising a device for detecting a pressure change in the gas generator, wherein the device for detecting the pressure change comprises a chamber divided by a movable part into two partial chambers which are gas-tight with respect to each other, the partial chambers having openings which are in flow connection with the first stage and each have different cross-sectional areas, so that the pressure change spreads at different speeds in the two partial chambers and brings about a movement of the movable part, and the movable part being connected with a movement meter, which due to the movement of the movable part generates an electrical impulse to activate the second stage.

The basic idea of the invention is to carry out a dynamic pressure comparison instead of the static pressure comparison according to EP 0 502 630 A2, i.e. to detect a chronological change of the pressure. For this, a chamber is provided for measuring the chronological pressure change, which is divided by a movable part into two partial chambers which are gas-tight with respect to each other. Openings in flow connection respectively with the first stage are provided for the two partial chambers, the cross-sectional area of the openings being different. Thereby, a pressure change brought about by the activation of the first stage can spread at different speeds in the two partial chambers. The pressure change can be both a drop in pressure, such as for example with a first cold-gas-generating stage, or a pressure rise, such as for example with the deflagration of a first combustion-gas-generating stage.

A movement meter is connected with the movable part between the air-tight partial chambers, which meter, owing to the movement of the movable part caused by the pressure change, generates an electrical impulse which activates the second stage. e.g. an electric, ignitable propellant charge. The electrically ignitable propellant charge can in turn ignite further propellant.

A particularly preferred further development of the invention is to be seen in that a piezo-element is used as movement meter, which converts the movement or the force onto the movable part by means of the piezoelectric effect directly into an electric impulse, which is sufficiently great to activate an electrically ignitable propellant charge. For the automatic activation of the second gas-generating stage, therefore no additional electrical connection cables or other elements have to be introduced into the interior of the gas generator. The risk of penetration of air and moisture can therefore be avoided. An adaptation of the gas generator output to customers wishes is possible without costly changes to the construction.

BRIEF DESCRIPTION OF THE DRAWINGS

The invention is explained in further detail below with the aid of example embodiments with reference to the enclosed drawing.

In the drawing.

DESCRIPTION OF PREFERRED EMBODIMENTS

Figure 1:
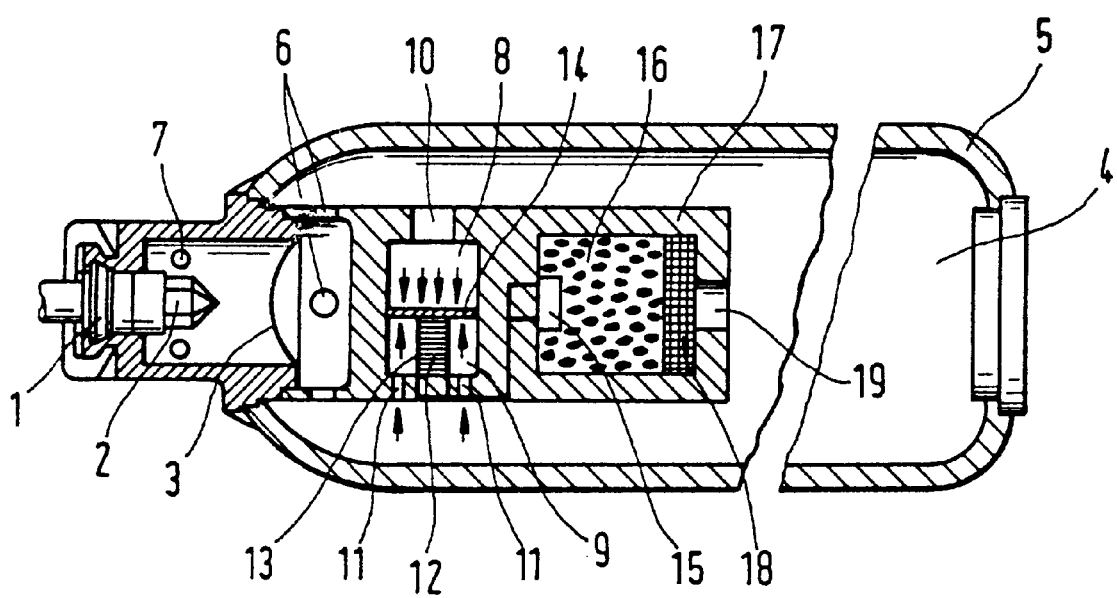
FIG. 1 shows a gas generator with a chamber for measuring the pressure change.

FIG. 1 shows an example embodiment of a hybrid gas generator, in which the first gas-generating stage is a cold gas stage and the second stage, arranged thereafter, is a combustion stage. To activate the first gas-generating stage, an igniter 1 is ignited, which accelerates a projectile 2 in the direction of the rupture membrane 3, whereby the latter is pounded to pieces. Thereby, the compressed gas 4 stored in the compressed gas chamber 5 can flow out from the through-flow openings 6 and also from the outflow openings 7. The chamber for measuring the chronological pressure change is integrated into the compressed gas chamber 5 and has a first partial chamber 8 and a second partial chamber 9 separated therefrom by the movable part 14. The first partial chamber 8 has an opening 10, the cross-sectional area of which is greater than the entire cross-sectional area of the two openings 11 of the second partial chamber 9. A piezo element 12 is connected with the movable part 14, which piezo element 12 has electrical connections 13 which are connected to the electric igniter 15. As already described initially, the pressure change brought about by the activation of the first stage in the first partial chamber 8 will spread more quickly owing to the larger opening 10 and will therefore produce a pressure difference between the first partial chamber 8 and the second partial chamber 9. Through this pressure difference, a force acts on the movable part 14, which is converted into an electrical impulse by means of the piezo element 12 as movement meter. In the electric igniter 15, the electrical impulse is compared with a threshold value. On exceeding the threshold value, the electric igniter 15 is activated. The electric igniter 15 then ignites the propellant 16 in the combustion chamber 17, whereby a hot combustion gas is produced. The hot combustion gas flows through the filter 18 from the outflow openings 19 into the compressed gas chamber and mixes with the cold compressed gas still contained therein. The mixture then flows out in the manner described above via the through-flow openings 6 and outflow openings 7.

The chronological change of the pressure difference between the first and second partial chamber 8, 9 can be influenced here in a manner directed to specific objectives by the cross-sectional areas of the openings 10, 11 of the first and second partial chamber. Thereby, it is possible in particular to control the sensitivity of the arrangement so that a release through pressure fluctuations, due to climate, for example temperature changes, can be ruled out, because its time constant is several times longer than the time constant of the pressure change on activation of the first gas-generating stage.

Generally, the basic concept of the chamber for measuring the chronological pressure change can also detect pressure rises. This can be significant for example when the first gas-generating stage is a combustion gas stage. The hot combustion gas of the first stage is then to be directed past the openings of the partial chambers, whereby the pressure change is detected. The chamber for measuring the chronological pressure change would then be arranged in the outflow region of the first stage. Through the pressure rise as a result of the ignition of the first gas-generating stage, in turn a movement meter is activated and the second gas-generating stage is ignited by means of an electric igniter.

Figure 2A:
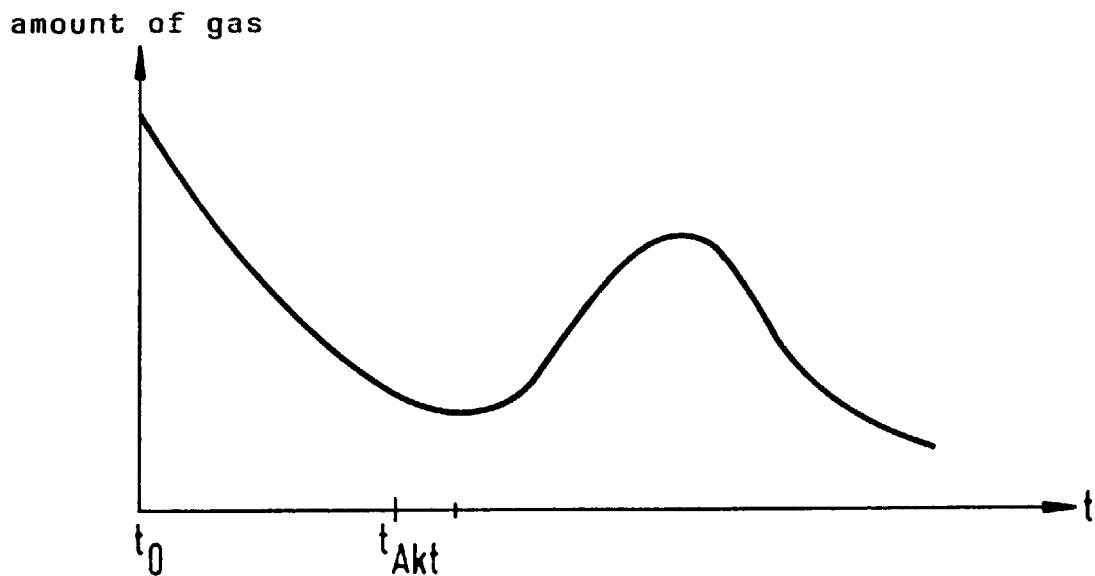
FIGS. 2a and 2b show diagrams of the most important system parameters.
Figure 2B:
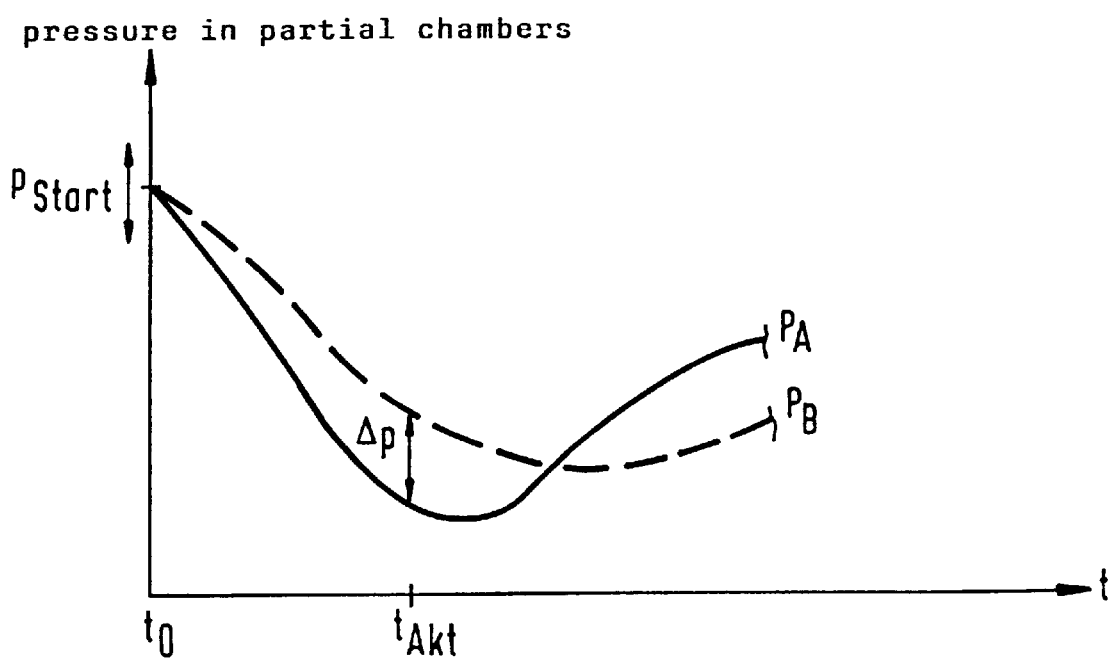

FIGS. 2a and 2b show the essential system parameters as a function of time. Thus, FIG. 2a shows the ouflowing quantity of gas in percentage. If at the moment t0 the first gas-generating stage is activated, firstly the cold gas flows out. As can be seen from FIG. 2b, the pressures in the two partial chambers 8, 9 here decrease at differing speeds. Thus, the pressure $P_A$ in the first partial chamber falls more quickly than the pressure $P_B$ in the second partial chamber, so that a pressure difference Δp is reached. As a function of this pressure difference, the piezo element 12 generates an electrical impulse, which at the moment $t_{Akt}$ exceeds a previously established threshold value. Then, firstly the electric igniter 15 is activated and then the propellant 16 is ignited. Thereby, in turn, the outflowing gas quantity increases, as can be seen in FIG. 2a, and namely now owing to the release of the hot gas. The pressure difference here is independent of the initial pressure $P_{Start}$ in a wide range, so that it is possible, for the purpose of adapting the desired quantity of gas, to fill the compressed gas chamber 5 with a different quantity of compressed gas or to set it under various pressures, without the performance of the arrangement being impaired.

What is claimed is:

1. A gas generator, comprising a first gas-generating stage and at least one gas-generating stage arranged downstream of the first stage, and also comprising a device for detecting a pressure change in the gas generator, wherein the device for detecting the pressure change comprises a chamber divided by a movable part into two partial chambers which are gas-tight with respect to each other, the partial chambers having openings which are in flow connection with the first stage and each have different cross-sectional areas, so that the pressure change spreads at different speeds in the two partial chambers and brings about a movement of the movable part, and the movable part being connected with a movement meter, which due to the movement of the movable part generates an electrical impulse to activate the second stage.

2. The gas generator according to claim 1, wherein the movement meter is a piezoelectric element.

3. The gas generator according to claim 1, wherein the activation of the second stage takes place by igniting an electrically ignitable propellant charge.

4. The gas generator according to claim 3, wherein through the igniting of the electrically ignitable propellant charge, further propellant is ignited.

5. The gas generator according to claim 1, wherein the first gas-generating stage is a cold gas stage of a hybrid generator.

6. The gas generator according to claim 1, wherein the device for detecting the pressure change, the electrically ignitable propellant charge and optionally further propellant are arranged inside a compressed gas chamber of a hybrid gas generator.

* * * * *